(12) United States Patent
Hogue et al.

(10) Patent No.: US 8,239,394 B1
(45) Date of Patent: Aug. 7, 2012

(54) BLOOM FILTERS FOR QUERY SIMULATION

(75) Inventors: Andrew W. Hogue, Pompton Lakes, NJ (US); Douglas L. T. Rohde, Pelham, NY (US); Peter J. Weinberger, Syosset, NY (US)

(73) Assignee: Google Inc., Mountain View, CA (US)

( * ) Notice: Subject to any disclaimer, the term of this patent is extended or adjusted under 35 U.S.C. 154(b) by 1983 days.

(21) Appl. No.: 11/097,676

(22) Filed: Mar. 31, 2005

(51) Int. Cl.
*G06F 17/30* (2006.01)

(52) U.S. Cl. ....................................................... 707/754

(58) Field of Classification Search ........ 707/3; 709/203
See application file for complete search history.

(56) References Cited

U.S. PATENT DOCUMENTS

| | | |
|---|---|---|
| 4,888,690 A | 12/1989 | Huber |
| 4,899,292 A | 2/1990 | Montagna et al. |
| 5,475,819 A | 12/1995 | Miller et al. |
| 5,544,051 A | 8/1996 | Senn et al. |
| 5,560,005 A | 9/1996 | Hoover et al. |
| 5,574,898 A | 11/1996 | Leblang et al. |
| 5,778,378 A | 7/1998 | Rubin |
| 5,815,415 A | 9/1998 | Bentley et al. |
| 5,832,479 A | 11/1998 | Berkowitz et al. ............ 707/3 |
| 5,870,739 A | 2/1999 | Davis, III et al. |
| 5,905,980 A | 5/1999 | Masuichi et al. |
| 5,946,692 A | 8/1999 | Faloutsos et al. ............ 707/101 |
| 5,963,940 A | 10/1999 | Liddy et al. |
| 6,006,221 A | 12/1999 | Liddy et al. |
| 6,014,661 A | 1/2000 | Ahlberg et al. |
| 6,026,388 A | 2/2000 | Liddy et al. |
| 6,029,195 A | 2/2000 | Herz |
| 6,101,515 A | 8/2000 | Wical et al. |
| 6,105,020 A * | 8/2000 | Lindsay et al. ................ 707/2 |
| 6,105,030 A | 8/2000 | Syed et al. |
| 6,216,138 B1 | 4/2001 | Wells et al. |
| 6,222,540 B1 | 4/2001 | Sacerdoti |
| 6,263,328 B1 | 7/2001 | Coden et al. |
| 6,263,335 B1 | 7/2001 | Paik et al. |
| 6,304,864 B1 | 10/2001 | Liddy et al. |
| 6,311,189 B1 | 10/2001 | deVries et al. |
| 6,326,962 B1 | 12/2001 | Szabo |

(Continued)

FOREIGN PATENT DOCUMENTS

| | | |
|---|---|---|
| JP | 11-265400 A | 9/1999 |

(Continued)

OTHER PUBLICATIONS

Burton H. Bloom, "Space/Time Trade-offs in Hash Coding with Allowable Error", *Communications of the ACM*, vol. 13, No. 7, Jul. 1970, pp. 422-426.

(Continued)

*Primary Examiner* — Syling Yen
(74) *Attorney, Agent, or Firm* — Morgan, Lewis & Bockius LLP

(57) ABSTRACT

A method of restricting a database access operation is disclosed. A plurality of Bloom filters corresponding to a plurality of fields in a database are applied to two or more terms in a record to produce a first plurality of outputs. The record may correspond to a query. Extraneous terms may be removed from the record. The access operation to the database is enabled if the first plurality of outputs correspond to a positive result.

34 Claims, 14 Drawing Sheets

U.S. PATENT DOCUMENTS

| | | |
|---|---|---|
| 6,327,574 B1 | 12/2001 | Kramer et al. |
| 6,377,943 B1 | 4/2002 | Jakobsson |
| 6,480,194 B1 | 11/2002 | Sang'udi et al. |
| 6,519,631 B1 | 2/2003 | Rosenschein et al. |
| 6,529,900 B1 | 3/2003 | Patterson et al. |
| 6,584,464 B1 | 6/2003 | Warthen |
| 6,606,659 B1 | 8/2003 | Hegli et al. |
| 6,609,123 B1 | 8/2003 | Cazemier et al. |
| 6,629,097 B1 | 9/2003 | Keith |
| 6,643,641 B1 | 11/2003 | Snyder |
| 6,718,324 B2 | 4/2004 | Edlund et al. |
| 6,832,218 B1 | 12/2004 | Emens et al. |
| 6,850,896 B1 | 2/2005 | Kelman et al. |
| 6,873,982 B1 | 3/2005 | Bates et al. |
| 6,885,990 B1 | 4/2005 | Ohmori et al. |
| 6,928,436 B2 | 8/2005 | Baudel |
| 6,961,723 B2 | 11/2005 | Faybishenko et al. |
| 6,968,343 B2 | 11/2005 | Charisius et al. |
| 7,013,308 B1 | 3/2006 | Tunstall-Pedoe |
| 7,031,955 B1 | 4/2006 | de Souza et al. |
| 7,043,521 B2 | 5/2006 | Eitel |
| 7,100,083 B2 | 8/2006 | Little et al. |
| 7,146,538 B2 | 12/2006 | Johnson et al. |
| 7,158,983 B2 | 1/2007 | Willse et al. |
| 7,669,115 B2 | 2/2010 | Cho et al. |
| 2002/0055954 A1 | 5/2002 | Breuer |
| 2002/0065814 A1 | 5/2002 | Okamoto et al. |
| 2002/0065815 A1 | 5/2002 | Layden |
| 2002/0128818 A1 | 9/2002 | Ho et al. |
| 2002/0154175 A1 | 10/2002 | Abello et al. |
| 2002/0173984 A1 | 11/2002 | Robertson et al. |
| 2003/0005036 A1 | 1/2003 | Mitzenmacher ............ 709/203 |
| 2003/0069880 A1 | 4/2003 | Harrison et al. |
| 2003/0097357 A1 | 5/2003 | Ferrari et al. |
| 2003/0115485 A1* | 6/2003 | Milliken ................. 713/201 |
| 2003/0120373 A1 | 6/2003 | Eames |
| 2003/0120644 A1 | 6/2003 | Shirota |
| 2003/0120654 A1 | 6/2003 | Edlund et al. |
| 2003/0120659 A1 | 6/2003 | Sridhar |
| 2003/0154071 A1 | 8/2003 | Shreve |
| 2003/0158855 A1 | 8/2003 | Farnham et al. |
| 2003/0195872 A1 | 10/2003 | Senn |
| 2003/0208665 A1 | 11/2003 | Peir et al. ................. 711/169 |
| 2003/0217052 A1 | 11/2003 | Rubenczyk et al. |
| 2004/0015566 A1 | 1/2004 | Anderson et al. |
| 2004/0030731 A1* | 2/2004 | Iftode et al. ............... 707/205 |
| 2004/0107125 A1 | 6/2004 | Guheen et al. |
| 2004/0122844 A1 | 6/2004 | Malloy et al. |
| 2004/0125137 A1 | 7/2004 | Stata et al. |
| 2004/0167909 A1 | 8/2004 | Wakefield et al. |
| 2004/0220904 A1 | 11/2004 | Finlay et al. ................. 707/3 |
| 2004/0236655 A1 | 11/2004 | Scumniotales et al. |
| 2004/0255237 A1 | 12/2004 | Tong |
| 2004/0267700 A1 | 12/2004 | Dumais et al. |
| 2005/0022009 A1* | 1/2005 | Aguilera et al. ........... 713/201 |
| 2005/0033803 A1* | 2/2005 | Vleet et al. ................. 709/203 |
| 2005/0039033 A1 | 2/2005 | Meyers et al. |
| 2005/0050016 A1 | 3/2005 | Stanoi et al. ................. 707/3 |
| 2005/0055327 A1* | 3/2005 | Agrawal et al. ............... 707/1 |
| 2005/0057566 A1 | 3/2005 | Githens et al. |
| 2005/0060277 A1 | 3/2005 | Zlatanov et al. |
| 2005/0076012 A1 | 4/2005 | Manber et al. |
| 2005/0086520 A1* | 4/2005 | Dharmapurikar et al. .... 713/201 |
| 2005/0120004 A1* | 6/2005 | Stata et al. ................... 707/3 |
| 2005/0187898 A1* | 8/2005 | Chazelle et al. ............... 707/1 |
| 2005/0216464 A1 | 9/2005 | Toyama et al. |
| 2005/0219929 A1* | 10/2005 | Navas ..................... 365/212 |
| 2005/0256825 A1 | 11/2005 | Dettinger et al. |
| 2005/0268212 A1 | 12/2005 | Dagel |
| 2006/0004851 A1 | 1/2006 | Gold et al. |
| 2006/0020582 A1 | 1/2006 | Dettinger et al. |
| 2006/0047838 A1 | 3/2006 | Chauhan |
| 2006/0085386 A1 | 4/2006 | Thanu et al. |
| 2006/0085465 A1 | 4/2006 | Nori et al. |
| 2006/0149700 A1 | 7/2006 | Gladish et al. |
| 2006/0173824 A1 | 8/2006 | Bensky et al. |
| 2006/0206508 A1 | 9/2006 | Colace et al. |
| 2006/0224582 A1 | 10/2006 | Hogue |
| 2007/0022085 A1 | 1/2007 | Kulkarni |
| 2007/0055656 A1 | 3/2007 | Tunstall-Pedoe |
| 2007/0067108 A1* | 3/2007 | Buhler et al. ............... 702/19 |
| 2007/0179965 A1 | 8/2007 | Hogue et al. |
| 2007/0203867 A1 | 8/2007 | Hogue et al. |
| 2007/0203868 A1 | 8/2007 | Betz |
| 2007/0271249 A1 | 11/2007 | Cragun et al. |
| 2008/0005064 A1 | 1/2008 | Sarukkai |
| 2008/0097958 A1 | 4/2008 | Ntoulas et al. |
| 2008/0209444 A1 | 8/2008 | Garrett et al. |

FOREIGN PATENT DOCUMENTS

| | | |
|---|---|---|
| JP | 2002-157276 A | 5/2002 |
| JP | 2002-540506 A | 11/2002 |
| JP | 2003-281173 A | 10/2003 |
| WO | WO 2004/114163 A2 | 12/2004 |

OTHER PUBLICATIONS

"Bloom filter", *Wikipedia*, http://en.wikipedia.org/wiki/Bloom_filter (last modified Feb. 13, 2005).

"Bloom Filters—the math", http://www.cs.wisc.edu/~cao/papers/summary-cache/node8.html.

Bharat, Personalized, Interactive News on the Web, Georgia Institute of Technology, Atlanta, GA, May 5, 1997, pp. 1-22.

Brill, An Analysis of the AskMSR Question-Answering System, Proceedings of the Conference of Empirical Methods in Natural Language Processing (EMNLP), Jul. 2002, 8 pages.

Brin, Extracting Patterns and Relations from the World Wide Web, Computer Science Department, Stanford University, 1999, 12 pages.

Brin, The Anatomy of a Large-Scale Hypertextual Web Search Engine, 7th International World Wide Web Conference, Brisbane, Australia, Apr. 14-18, 1998, pp. 1-26.

Chang, IEPAD: Information Extraction Based on Pattern Discovery, WWW10 '01, ACM, Hong Kong, May 1-5, 2001, pp. 681-688.

Chesnais, The Fishwrap Personalized News System, Community Networking, Integrated Multimedia Services to the Home, Proceedings of the Second International Workshop on, Jun. 20-22, 1995, pp. 275-282.

Chu-Carroll, A Multi-Strategy with Multi-Source Approach to Question Answering, IBM T.J. Watson Research Center, Yorktown Heights, NY, 2006, 8 pages.

Clarke, FrontPage 2002 Tutorials—Adding Functionality to your Website with FrontPage 2002 Part II—Navigation, ABC—All 'Bout Computers, Apr. 2002, vol. 11, 8 pages.

Cowie, MOQA: Meaning-Oriented Question-Answering, Proceedings of RIAO 2004, 15 pages.

Dean, MapReduce: Simplified Data Processing on Large Clusters, OSDI, 2004, pp. 1-13.

Etzioni, Web-scale Information Extraction in KnowItAll (Preliminary Results), WWW2004, ACM, New York, NY, May 17-20, 2004, 11 pages.

Freitag, Boosted Wrapper Induction, American Association for Artificial Intelligence, 2000, 7 pages.

Google Inc., International Preliminary Report on Patentability, PCT/US2007/061158, Jul. 29, 2008, 7 pages.

Google Inc., International Search Report/Written Opinion, PCT/US06/07639, Sep. 13, 2006, 5 pages.

Google Inc., International Search Report/Written Opinion, PCT/US07/061157, Feb. 15, 2008, 10 pages.

Google Inc., International Search Report/Written Opinion, PCT/US07/61156, Feb. 11, 2008, 5 pages.

Google Inc., International Search Report/Written Opinion, PCT/US2006/010965, Jul. 5, 2006, 9 pages.

Google Inc., Office Action, Japanese Patent Application 2008-504204, Oct. 12, 2011, 4 pgs.

Guha, Disambiguating People in Search, WWW2004, New York, NY, May 17-22, 2004, 9 pages.

Guha, Object Co-Identification on the Semantic Web, WWW2004, ACM, New York, NY, May 17-22, 2004, 9 pages.

Hogue, Tree Pattern Inference and Matching for Wrapper Induction on the World Wide Web, Master of Engineering in Electrical Engineering and Computer Science, Massachusetts Institute of Technology, Jun. 2004, pp. 1-106.

Ilyas, Rank-Aware Query Optimization, ACM SIGMOD 2004, Paris, France, Jun. 13-18, 2004, 12 pages.

Information Entropy—Wikipedia, the free encyclopedia, retrieved on May 3, 2006, pp. 1-9.

Information Theory—Wikipedia, the free encyclopedia, retrieved on May 3, 2006, pp. 1-12.

Jones, Bootstrapping for Text Learning Tasks, Carnegie Mellon University, Pittsburgh, PA, 1999, 12 pages.

Kamba, The Krakatoa Chronicle, An interactive, Personalized, Newspaper on the Web, Mar. 2, 2008, pp. 1-12.

Kosseim, Answer Formulation for Question-Answering, Concordia University, Montreal, Quebec, Canada, Oct. 1, 2007, 11 pages.

Lin, Question Answering from the Web Using Knowledge Annotation and Knowledge Mining Techniques, CIKM'03, New Orleans, LA, Nov. 3-8, 2003, pp. 116-123.

Liu, Mining Data Records in Web Pages, Conference '00, ACM 2000, pp. 1-10.

McCallum, Object Consolidation by Graph Partitioning with a Conditionally-Trained Distance Metric, SIGKDD 03, Washington, DC, Aug. 24-27, 2003, 6 pages.

Mihalcea, PageRank on Semantic Networks, with Application to Word Sense Disambiguation, Proceedings of the 20th International Conference on Computational Linguistics, Aug. 23-27, 2004, 7 pages.

Mihalcea, TextRank: Bringing Order into Texts, Proceedings of the Conference on Empirical Methods in Natural Language Processing, Jul. 2004, 8 pages.

Nyberg, The JAVELIN Question-Answering System at TREC2003: A Multi-Strategy Approach With Dynamic Planning, TREC2003, Nov. 18-21, 2003, 9 pages.

Ogden, Improving Cross-Language Text Retrieval with Human Interactions, Proc. of the 33rd Hawaii International Conference on System Sciences, IEEE 2000, pp. 1-9.

Prager, IBM's Piquant in TREC2003, Nov. 18-21, 2003, 10 pages.

Prager, Question Answering Using Constraint Satisfaction: QA-by-Dossier-with-Constraints, 2004, 8 pages.

Ramakrishnan, Is Question Answering an Acquired Skill?, WWW2004, New York, NY, May 17, 2004, pp. 111-120.

The MathWorks, Using Matlab Graphics, Version 5, MathWorks, Natick, MA, Dec. 1996, 52 pgs.

Thompson, Freshman Publishing Experiment Offers Made-to-Order Newspapers, MIT News Office, Mar. 9, 1994, pp. 1-4.

* cited by examiner

BLOOM FILTERS FOR QUERY SIMULATION

FIELD OF THE INVENTION

The present invention relates generally to search queries in search engines, such as Internet and Intranet search engines, and more specifically to restricting a database access operation in a search engine using Bloom filters.

BACKGROUND

Search engines provide a powerful tool for locating content in documents in a large database of documents, such as the documents on the Internet or World Wide Web (WWW), or the documents stored on the computers of an Intranet. The documents are located using an index of documents in response to a search query, consisting of one or more words, terms, keywords and/or phrases, that is submitted by a user.

Returning search results that closely match, or ideally, that do match a user's search query is a desired characteristic of search engines. This is especially the case in the current environment where there are ever increasing amounts of information. In addition, returning results promptly is also a desired characteristic.

The heterogeneous nature of search queries poses a challenge for processing them efficiently. Search queries are often free-form. The set of queries and the corresponding categories of information and/or content are not pre-defined. As a consequence, it may be difficult to efficiently access databases containing the index of documents and/or content corresponding to the index of documents. Furthermore, resources, such as memory, available for processing a respective set of operations, such as accessing a database, may be constrained by the sheer number of services that are running on the search engine at a given time. Pre-screening or simulating database access operations to determine if it is likely that corresponding information may be present in the database could improve the utilization of resources and the overall performance of search engines. There is a need, therefore, for search engines having such simulation capability.

SUMMARY

A method of restricting a database access operation is disclosed. A plurality of Bloom filters corresponding to a plurality of fields in a database are applied to two or more terms in a record to produce a first plurality of outputs. The record may correspond to a query. Extraneous terms may be removed from the record. The access operation to the database is enabled if the first plurality of outputs correspond to a positive result.

Two or more terms in the record may be sorted to produce a sorted record. A first Bloom filter may be applied to the sorted record to produce a sorted output. The access operation to the database may be enabled if the sorted output corresponds to a positive result.

The database may include factual information. The plurality of fields in the database may include objects, attributes and values.

In some embodiments, first and second subsets of the terms in the query are identified. A first Bloom filter in the plurality of Bloom filters is applied to the first subset to produce a first output. A second Bloom filter in the plurality of Bloom filters is applied to the second subset to produce a second output. The access operation is enabled when the first output and the second output both correspond positive results.

In some embodiments, a plurality of subsets of the terms in the query are identified. One or more of the Bloom filters are applied to each of the subsets to produce a second plurality of outputs. The access operation is enabled when the second plurality of outputs correspond to at least one of a plurality of success patterns.

In some embodiments, a normalization operation is applied to the query to produce a normalized set of terms. An additional Bloom filter is applied to each of the terms in the normalized set of terms to produce an additional output. The access operation is enabled in further accordance with the additional output corresponding to a positive result.

In some embodiments, the terms in the record are parsed in a plurality of ways to produce a plurality of parsed sets of terms. At least two of the Bloom filters in the plurality of Bloom filters are applied to the plurality of parsed sets of terms to produce a third plurality of outputs. The access operation is enabled in accordance with the third plurality of outputs corresponding to a positive result. The two Bloom filters may respectively correspond to an attribute field and a value field of a database.

In some embodiments, a first Bloom filter in the plurality of Bloom filters is applied to one or more terms in the record to produce a third output. Remaining terms in the record are sorted. A second Bloom filter in the plurality of Bloom filters is applied to the sorted remaining terms in the record to produce a fourth output. The access operation is enabled in further accordance with the third output and the fourth output corresponding to positive result. A first field corresponding to the first Bloom filter may include attributes. A second field corresponding to the second Bloom filter may include values. The one or more terms in the record may include a first term, a first two terms, a last term and/or a last two terms.

BRIEF DESCRIPTION OF THE DRAWINGS

For a better understanding of the invention, reference should be made to the following detailed description taken in conjunction with the accompanying drawings, in which.

DETAILED DESCRIPTION OF EMBODIMENTS

Figure 1:
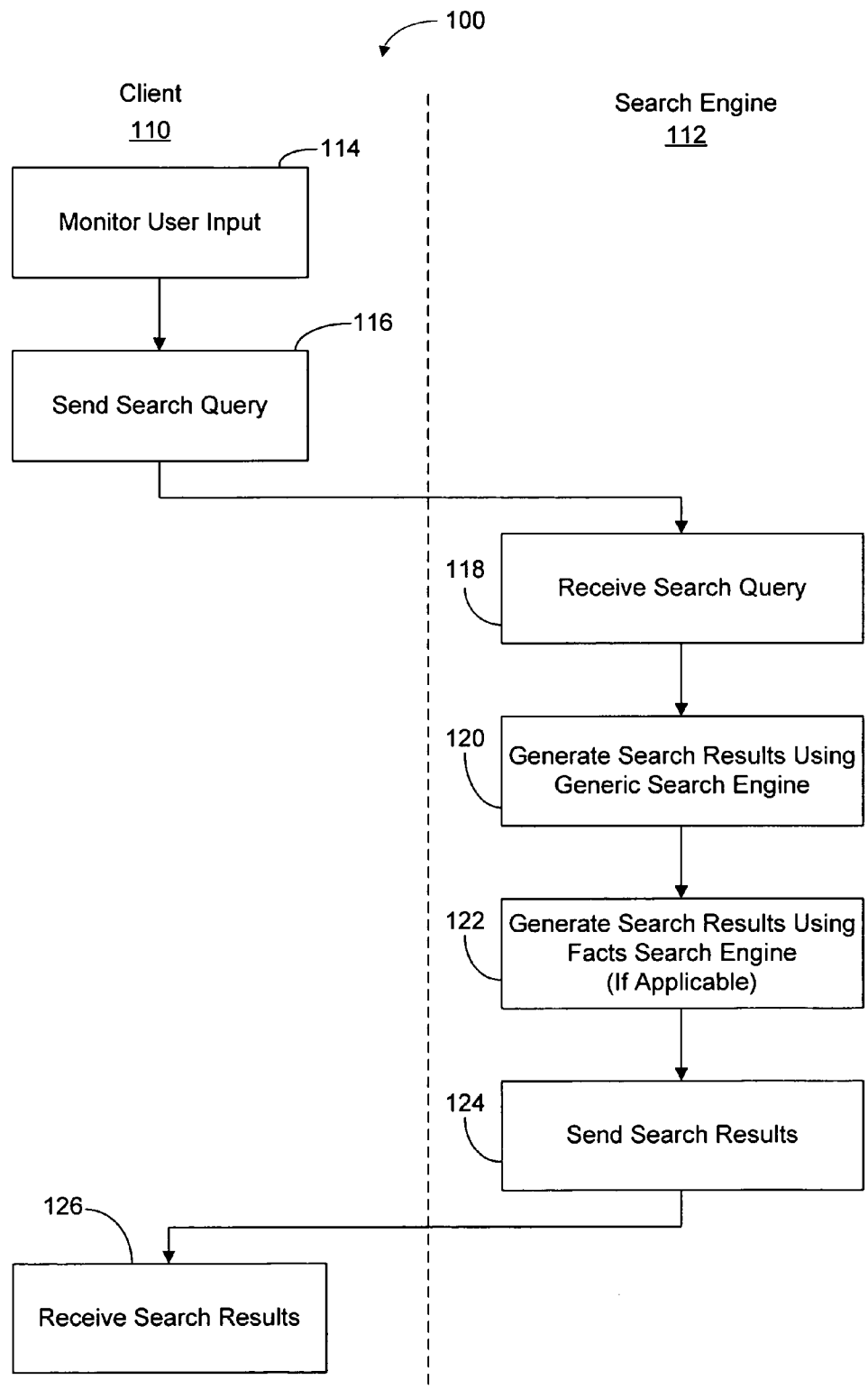
FIG. 1 is a flow diagram illustrating an embodiment of interaction between a client and a search engine.

Like reference numerals refer to corresponding parts throughout the drawings.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Restricting a database access operation using a plurality of Bloom filters is described. The Bloom filters contain one or more hashing functions and a corresponding filter array. A respective filter array contains entries corresponding to outputs from the one or more hashing functions when applied to respective terms input to the respective Bloom filter. The Bloom filters characteristics are selected based on a size of the database, a size of the filter array, a number and type of hashing functions and a pre-determined acceptable false positive rate. The Bloom filters are used to simulate an access operation based on a record. As explained in more detail below, if an output from one or more of the Bloom filters corresponds to a positive result the access operation is enabled.

In some embodiments, the record is a search query containing two or more words, terms, keywords and/or phrases. Henceforth, contents of a search query are referred to as terms. The search query may correspond to content located at one or more document locations. The one or more documents locations may correspond to one or more web sites and/or one or more web pages. The one or more document locations may include one or more uniform resource locators (URLs). The one or more document locations may be on an Intranet and/or the Internet, which is also referred to as the World Wide Web (WWW).

In an exemplary embodiment, the search query is a request for factual information, e.g., What is the capital of Spain? Such a request for factual information is henceforth called a fact query. A respective fact query may be processed by a regular or generic search engine and/or a facts search engine. Processing by the generic search engine and the facts search engine may occur sequentially or substantially simultaneously, i.e., substantially in parallel.

The facts search engine may include a facts database or facts repository. The facts repository may include a plurality of fields, including a name field, an attribute field and a value field. Attributes and values in the facts repository may be arranged in pairs, i.e., as attribute-value pairs.

The plurality of Bloom filters may be used to simulate an access operation to the facts repository based on a facts query. This will allow facts queries that do not correspond to content in the facts repository to be dropped, i.e., to block or not enable an access operation to the facts repository for such facts queries. While there is a small probability that outputs from the Bloom filters provide an erroneously positive result for a respective facts query, overall the Bloom filters offer a fast way to pre-screen or simulate access operations to improve resource allocation (for resources such as CPU cycles or search engine bandwidth) and performance of the facts search engine by reducing a number of facts queries that are processed.

FIG. 1 is a flow diagram illustrating an embodiment 100 of interaction between a client 110 and a search engine 112. User input at the client 110 is monitored (114). A search query is sent (116). The search query is received (118) by the search engine 112. Search results are generated using a generic search engine (120). Search results may be optionally generated using a facts search engine, if applicable (122). The search results are sent (124) to the client 110. The client 110 receives the search results (126). The flow diagram 100 may include fewer operations or additional operations. In addition, two or more operations may be combined and/or the order of the operations may be changed.

Figure 2:
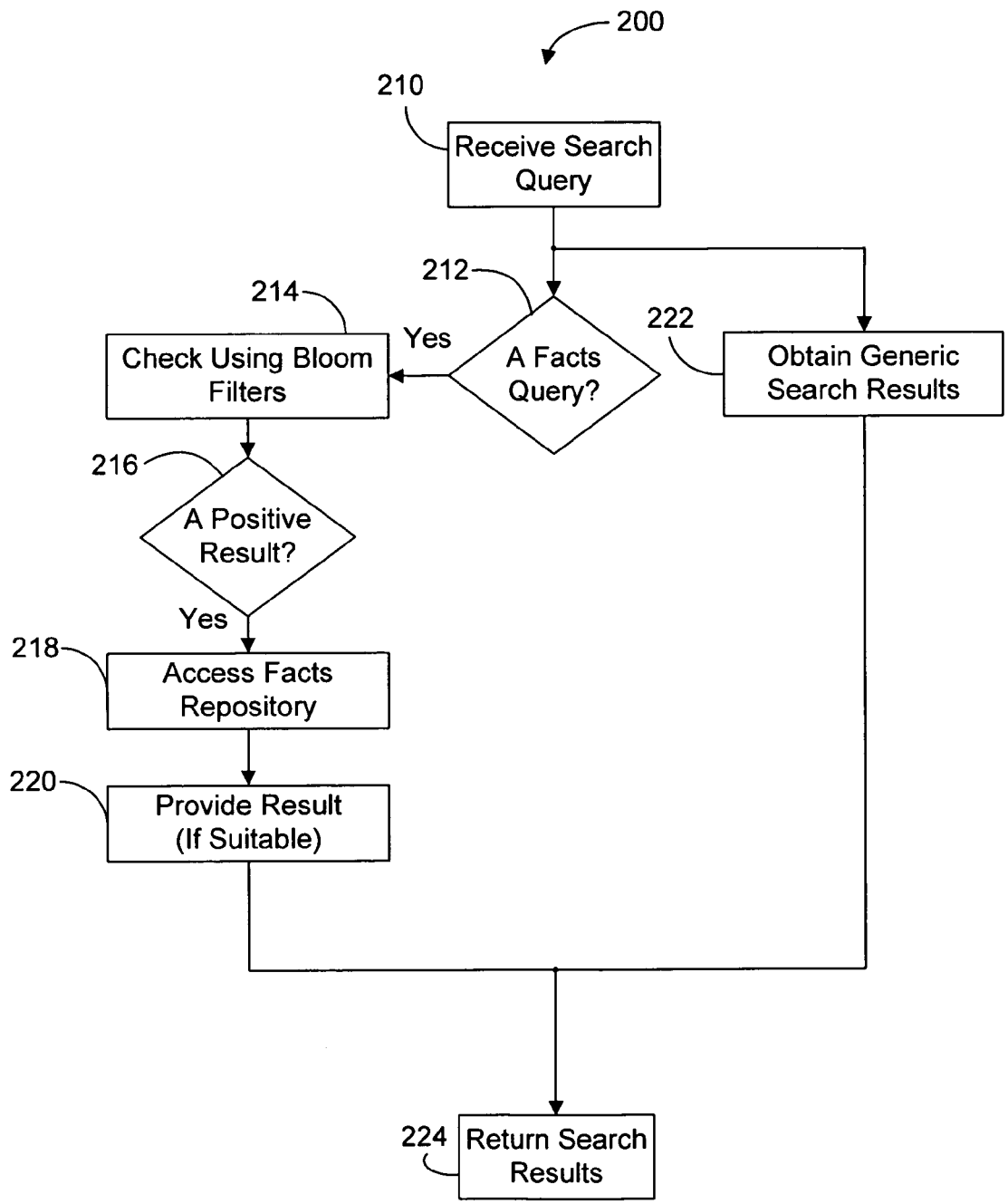
FIG. 2 is a flow diagram illustrating an embodiment of processing of a search query.

FIG. 2 is a flow diagram illustrating an embodiment 200 of processing of a search query. The search query is received (210). If the search query is a facts query (212), a check to determine if it is likely that a facts repository contains content corresponding to the facts query is performed using Bloom filters (214). If the outputs from the Bloom filters collectively correspond to a positive result (216) (the meaning of which will be addressed in more detail below), the facts repository is accessed (218). If a suitable result is available in the facts repository, it is provided (220). In parallel, the search query is processed by a generic search engine to obtain generic search results (222). Search results from facts search engine and/or the generic search engine are returned to the sender of the search query (224). The flow diagram 200 may include fewer operations or additional operations. In addition, two or more operations may be combined and/or the order of the operations may be changed.

Figure 3A:
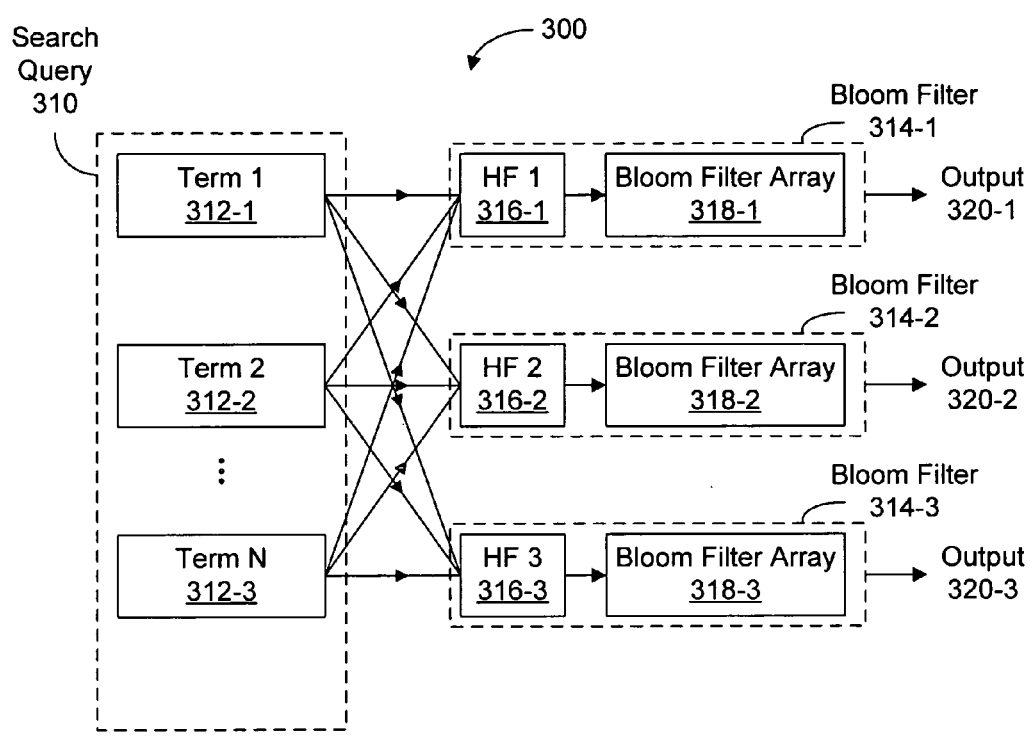
FIG. 3A is a block diagram illustrating an embodiment of processing of a search query using Bloom filters.
Figure 11:
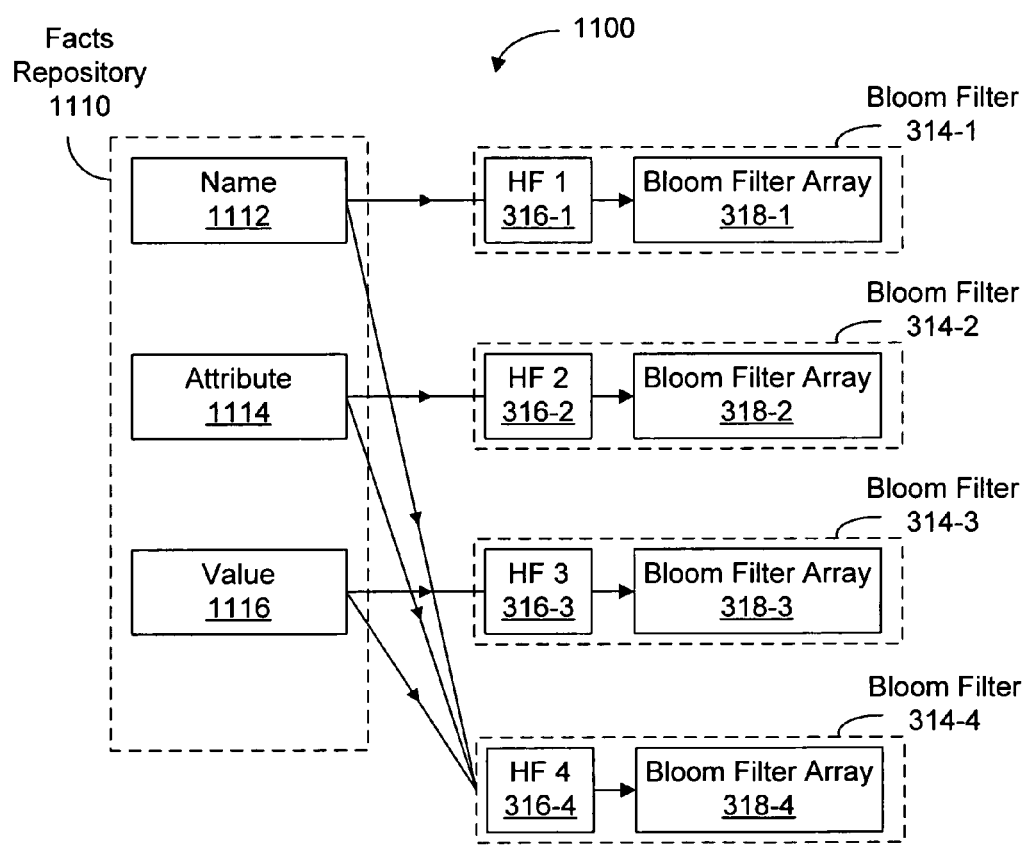
FIG. 11 is a block diagram illustrating an embodiment of processing content in a facts repository using Bloom filters.

FIG. 3A is a block diagram illustrating an embodiment 300 of processing of a search query using Bloom filters, such as the check using Bloom filters (214) in FIG. 2. A search query 310 includes two or more terms 312. The terms 312 are processed using Bloom filters 314 to produce outputs 320. Each Bloom filter has two or more hashing functions 316 and a Bloom filter array 318. For a respective term, such as term 312-1, outputs from the hashing functions 316-1 are compared to entries in Bloom filter array 318-1 (which were previously generated by applying the Bloom filters 314 to the contents of the facts repository, as is illustrated in FIG. 11 and discussed further below) to determine if it is likely that the facts repository contains content corresponding to the term 312-1. If yes, output 320-1 corresponds to a positive result. The access operation to the facts repository corresponding to the search query 310 may be enabled if one of more of the outputs 320 corresponds to the positive result. For instance, the access operation may be enabled if the first output 320-1 corresponds to a positive result and at least one of the other outputs corresponds to a positive result. As discussed below, there may be two or more patterns (sometimes herein called "success patterns") of output results that indicate that the access operation should enabled.

While FIG. 3A illustrates the processing of each term 312 by each Bloom filter 314, in alternate embodiments a respective term, such as the term 312-1, may be processed by a subset of the Bloom filters 314. In addition, while FIG. 3A illustrates N terms 312 and three Bloom filters 314, alternate embodiments may include fewer and/or more terms 312 and/or Bloom filters 314.

Figure 3B:
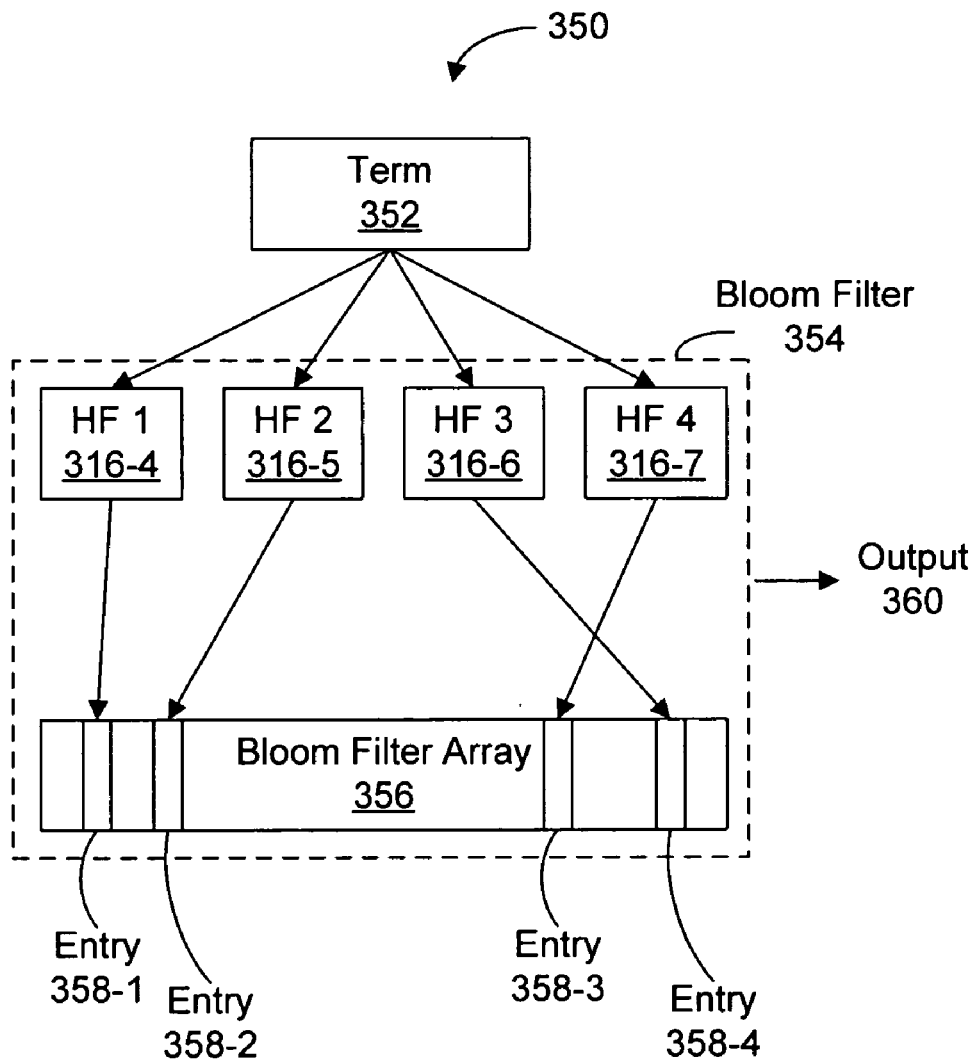
FIG. 3B is a block diagram illustrating an embodiment of processing of a term using a Bloom filter.

FIG. 3B is a block diagram illustrating an embodiment 350 of processing of a term 352 using a Bloom filter 354 having a plurality of hashing functions 316. Outputs from all the hashing functions 316 are compared to entries 358 in Bloom filter array 356 to generate output 360. The output 360 corresponds to the positive result if the outputs from all the hashing functions 316 match the corresponding entries 358 in the Bloom filter array 356. The reason for this methodology is that if the term 352 is in the facts repository, or the portion of the facts repository corresponding to this Bloom filter, then all the entries 358 in the Bloom filter identified by applying the hashing functions 316 to the term will have been set when the Bloom filter array was generated. While FIG. 3B illustrates the Bloom filter 354 containing four hashing functions 316, in alternate embodiments the Bloom filter 354 may contain fewer or more hashing functions 316.

Figure 4A:
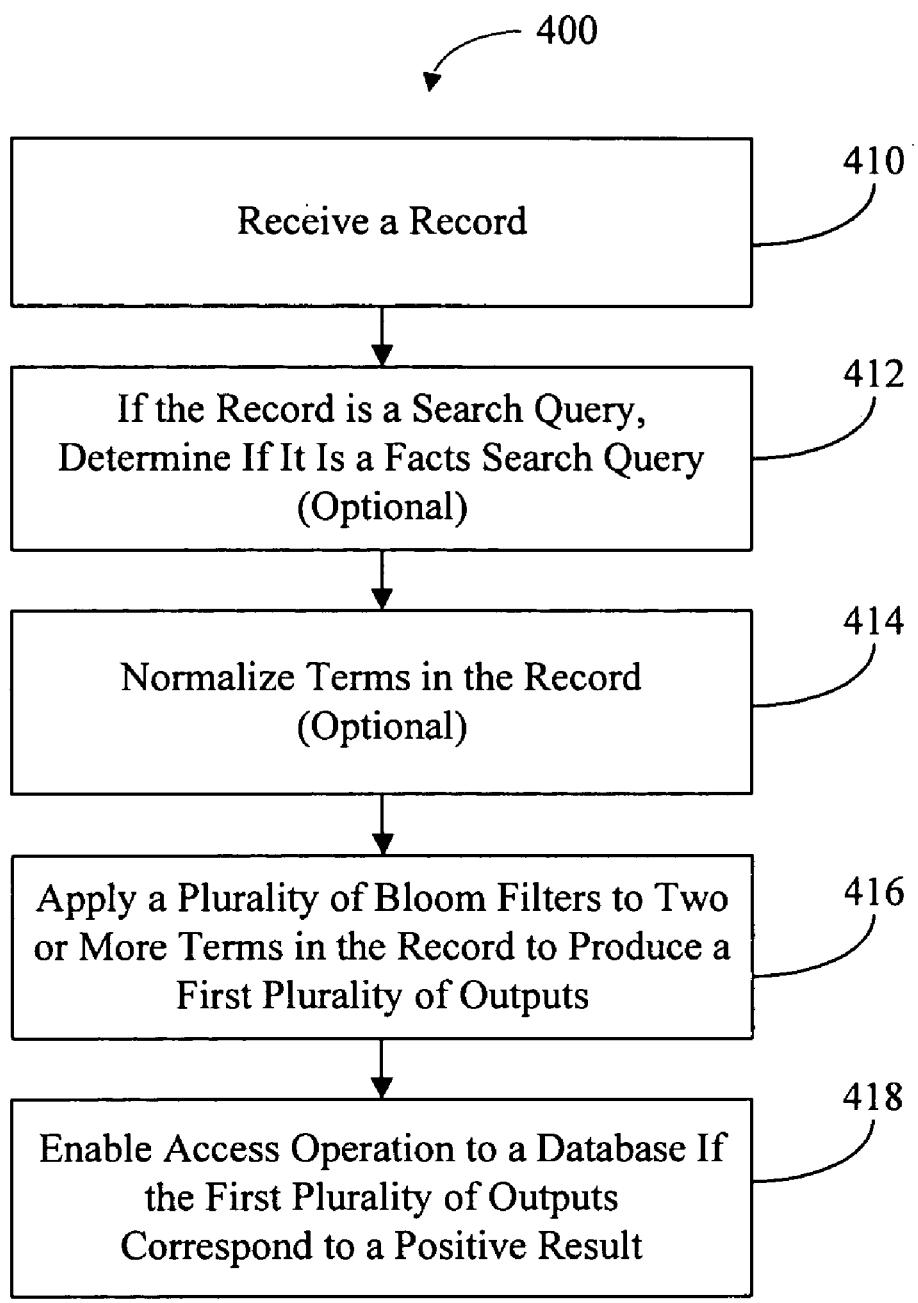
FIG. 4A is a flow diagram illustrating an embodiment of processing of a record.

There are a variety of approaches for using the plurality of Bloom filters, such as the Bloom Filters 314 (FIG. 3A), to simulate an access operation to a database, such as the facts repository in the facts search engine. FIG. 4A is a flow diagram illustrating an embodiment 400 of a method of processing a record using a plurality of Bloom filters. A record is received (410). If the record is a search query, optionally determine if it is a facts search query (412). Optionally normalize terms in the record (414). Normalization includes removal of extraneous terms, which are also referred to as stop words, from the record. Extraneous terms may include common words such as articles and/or prepositions, for example, 'the', 'that', 'or' and so forth. A plurality of Bloom filters are applied to two or more terms in the record to produce a first plurality of outputs (416). An access operation to a database is enabled if the first plurality of outputs corresponds to a positive result (418). The positive result may include outputs from the plurality of Bloom filters indicating a presence of entries in Bloom filter arrays corresponding to the two or more terms. In other embodiments, the method 400 may include fewer operations or additional operations. In addition, two or more operations may be combined and/or the order of the operations may be changed.

Figure 4B:
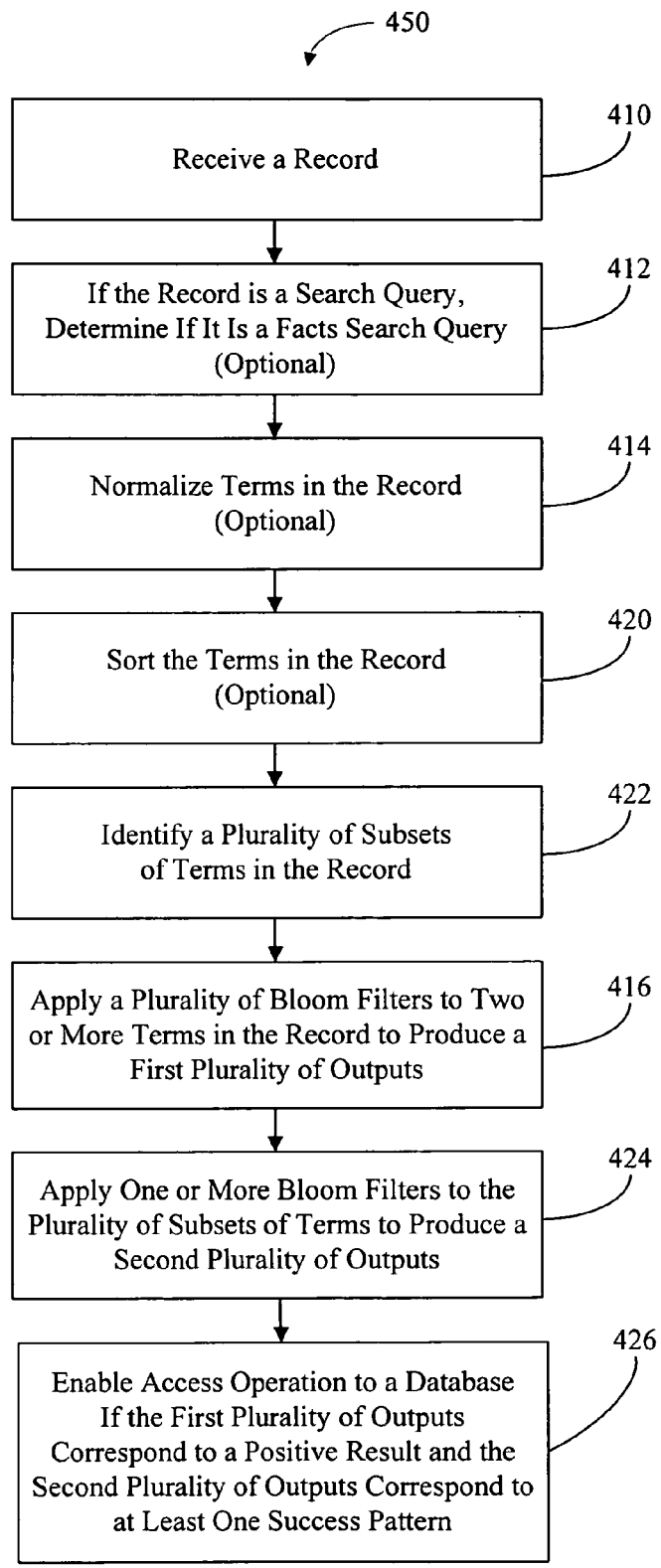
FIG. 4B is a flow diagram illustrating an embodiment of processing of a record.

FIG. 4B is a flow diagram illustrating an embodiment 450 of a method of processing of the record using the plurality of Bloom filters. The record is received (410). If the record is a search query, optionally determine if it is a facts search query (412). Optionally normalize terms in the record (414). Optionally sort the terms in the record (420). During sorting, terms in the record may be rearranged, for example, alphabetically. Identify a plurality of subsets of terms in the record (422). Identification may include associating one or more terms in the record with a respective field in the database. In some embodiments, the identification may be language independent, while in other embodiments it may be based on lexicographical analysis. The plurality of Bloom filters are applied to two or more terms in the record to produce the first plurality of outputs (416). One or more of the Bloom filters is applied to the plurality of subsets of terms to produce a second plurality of outputs (424). An access operation to the database is enabled if the first plurality of outputs corresponds to the positive result and the second plurality of outputs correspond to at least one success pattern (426). A success pattern may include one or more positive results in the second plurality of outputs. In other embodiments, the method 450 may include fewer operations or additional operations. In addition, two or more operations may be combined and/or the order of the operations may be changed.

Figure 4C:
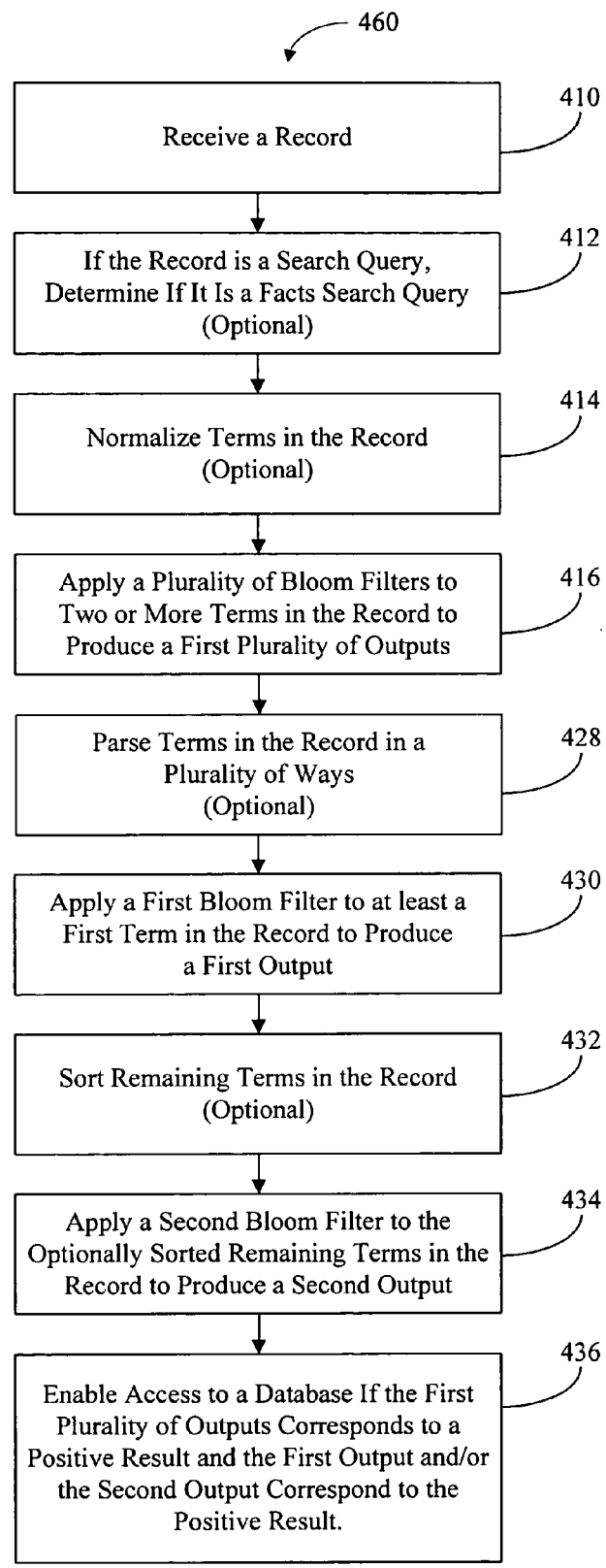
FIG. 4C is a flow diagram illustrating an embodiment of processing of a record.

FIG. 4C is a flow diagram illustrating an embodiment 460 of a method of processing of the record using the plurality of Bloom filters. The record is received (410). If the record is a search query, optionally determine if it is a facts search query (412). Optionally normalize terms in the record (414). The plurality of Bloom filters are applied to two or more terms in the record to produce the first plurality of outputs (416). Optionally parse terms in the record in a plurality of ways (428). The parsing may result in a variety of patterns that use one or more subsets of the terms in the record. Conceptually, each parsed set of terms may correspond to a respective linguistic pattern, where only one of the linguistic patterns accurately represents the linguistic functions of the terms in the record or query. For example, the query, "Who is the leader of the China?," may be parsed in a number of ways including, object name="China" and attribute="leader". Operations 430, 432 and 434 are applied to each of the parsed sets of terms. Apply a first Bloom filter to at least a first term in the parsed set of terms to produce a first output (430). Optionally sort remaining terms in the parsed set of terms (432). Apply a second Bloom filter to the optionally sorted remaining terms to produce a second output (434). An access operation to the database is enabled if both the first output and the second output correspond to a positive result for any one of the parsed sets of terms (436). In other embodiments, the method 460 may include fewer operations or additional operations. In addition, two or more operations may be combined and/or the order of the operations may be changed.

The database in embodiments 400, 450 and 460 may include factual information. The database may include the facts repository. Each of the Bloom filters may correspond to a name or objects field, an attribute field, a value field in the facts repository and/or a term field. The term field may include terms that are included in one or more of the other fields in the database.

In method 460, the term or terms in the record to which the first Bloom filter is applied may include a first or leading term in the record, the first two terms in the record, the last two terms in the record and/or the last term in the record. In operation 430, the first Bloom filter may correspond to an attributes field in the database. In operation 434, the second Bloom filter may correspond to a values field.

The Bloom filters may have a false positive rate of around 2% or less, and the Bloom filters may be allocated up to 20 MB of memory with which to perform simulations of access operations to the facts repository in the facts search engine. In an exemplary embodiment, the Bloom filters may be constructed using 2 bytes (i.e., 16 bits) per entry in a respective Bloom filter. Thus, in a term Bloom filter (discussed below, for example, with reference to FIG. 11) this is 2 bytes per distinct term. And for an attribute Bloom filter (discussed below, for example, with reference to FIG. 11), this is 2 bytes per distinct attribute. Another design parameter for the Bloom filters may be an expected number of insertions (i.e., items or terms inserted into the Bloom filter). Based on the number of insertions, an optimal value for the number of hashing functions k in the respective Bloom filter, i.e., the number k that minimizes the false positive rate, is selected. In the exemplary embodiment, k is 7. Given a ratio of a number of bits m in a respective Bloom filter array and a number of terms or elements n to be supported (such as the terms 312 in the search queries such as the search query 310 in FIG. 3A), a bound on the false positive rate may be determined, as is known in the art. In the exemplary embodiment, m/n is 16 bits, k (the number of hashing functions) is 7, and the false positive rate is less than 0.08%.

Figure 5:
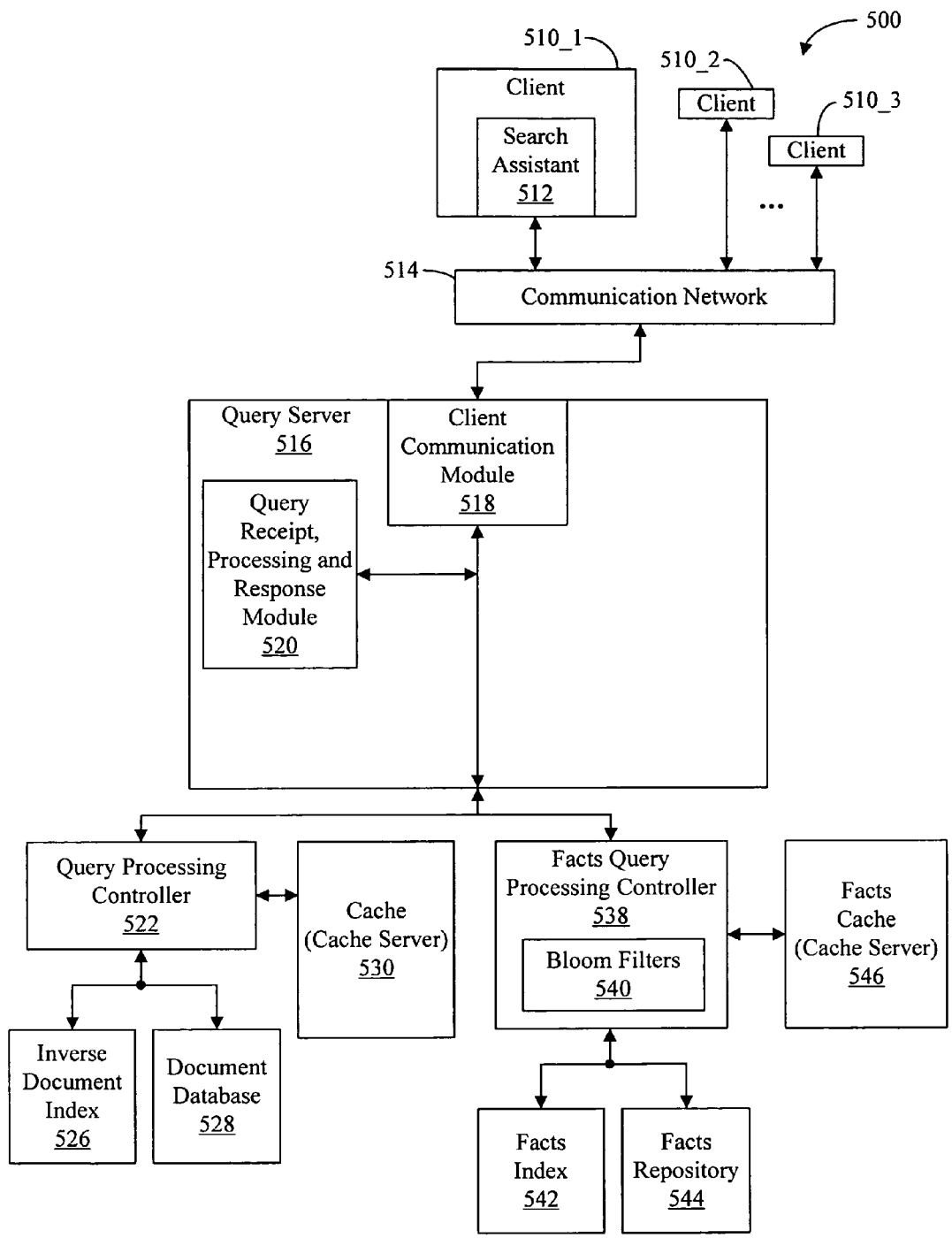
FIG. 5 is a block diagram illustrating an embodiment of a search engine system.

When a search query is received, it is processed by the facts search engine and the generic search engine, or in related support hardware in the system (as discussed below with reference to FIG. 5). In the facts search engine, the search query is normalized to remove or strip extraneous terms. If the search query only has one term remaining, an access operation to the facts repository may not be enabled.

Each remaining term in the search query is processed using a term Bloom filter corresponding to the term field in the facts repository. If any of the terms in the search query does not appear in a term Bloom filter array, i.e., if the output from the term Bloom filter does not correspond to the positive result, the access operation to the facts repository may not be enabled. The terms in the search query are sorted, for example, alphabetically, and a resulting string is processed using a name Bloom filter that corresponds to the name field in the facts repository. If the output from the name Bloom filter corresponds to the positive result, the access operation to the facts repository may be enabled.

A first or leading term in the search query is processed using an attribute Bloom filter. Remaining terms in the search query are sorted, for example, alphabetically, and a resulting string is processed using a value Bloom filter. If outputs from the attribute Bloom filter and the value Bloom filter correspond to the positive result, the access operation to the facts repository may be enabled.

The operations discussed in the preceding paragraph may be repeated a plurality of times, where the attribute Bloom filter during an instance of the operations is applied to the first two terms in the search query, the last two terms in the search query and/or the last term in the search query. In addition, the value filter may be applied to the remaining terms in the search query.

If the simulation does not enable the access operation to the facts repository, the generic search engine provides results in response to the search query. If the access operation is enabled, results from the facts search engine and/or the generic search engine may be provided. Results may include a ranked set of documents, snippets of content in a ranked set of documents and/or a ranked set of document locations or links. Results from the facts search engine and the generic search engine may be displayed in separate lists and/or in a common list.

As an illustration, consider a search query of "Bob Smith date of birth." Normalizing the search query may remove the term "of." The normalized search query becomes "Bob Smith date birth."

"Bob," "Smith," "date" and "birth" may each be tested against the term Bloom filter. If the output from the term Bloom filter is not a positive result, i.e., if any term produces a negative result, the access operation to the facts repository is not enabled. If all the terms in the normalized search query produce a positive result when tested against the term Bloom filter, simulation of the search query continues.

Next, the terms of the normalized search query are sorted, for example alphabetically to produce "birth Bob date Smith," and the resulting string is tested against the name Bloom filter. If the result is positive the access operation is enabled, and if the result is negative and the normalized search query has more than one term (which it does, in this example), simulation of the access operation continues.

The terms in the normalized search query may be parsed in a variety of ways and processed using two of more of the Bloom filters. In this example, the terms in the normalized query are parsed in four ways, with each parsing producing two sets of terms: Set1 and Set2. The four parsings are: 1) Set1: first term, Set2: remaining terms in sorted order; 2) Sett: first two attribute terms, Set2: remaining terms in sorted order; 3) Set1: last term, Set2: remaining terms in sorted order; and 4) Set1: last two attribute terms, Set2: remaining terms in sorted order. For the normalized search query "Bob Smith date birth," the four parsings are: 1) Set1:"Bob," Set2: "birth date Smith"; 2) Set1: "Bob Smith", Set2: "birth date"; 3) Set1: "birth", Set2: "Bob date Smith"; 4) Set1: "birth date", Set2: "Bob Smith".

For each of these four pairs of sets, the Attribute Bloom filter is applied to Sell to produce a first result and the value Bloom filter is applied to Set2 to produce a second result. As a result, there can be four sets of results. If both results (i.e., the first and second results) in any of these four sets are positive, then the search query is passed to the fast search engine for processing. Whenever a pair of positive results is generated, the simulation is stopped and the search query is passed to the facts search engine for processing. If none of the four pairs of results are both positive, the search query is not sent to the facts search engine for processing.

In this example, the application of the value Boom filter to "Bob Smith" and the attribute filter to "birth date" will both produce positive results, and therefore the search query is passed (using parsing option #4 described above) to the facts search engine. In this example, none of the other pairs of results are both positive, but only one pair of positive results is required for the search query to be passed to the facts search engine for processing. In other embodiments, additional parsing patterns and/or additional Bloom filter tests could be used when determining whether to send the search query to a facts search engine for processing.

In some embodiments, one or more of these ways of parsing the search query may be used. In some embodiments, the access operation to the facts repository is enabled if two of the Bloom filters in a set of Bloom filters including the name Bloom filter, the attribute Bloom filter and the value Bloom filter have an output corresponding to the positive result. In embodiments where the search query is a name query, i.e., the output from the name Bloom filter corresponds to the positive result, the access operation to the facts repository may be enabled.

Attention is now given to hardware and systems that may utilize and/or implement the simulation of a database access operation and/or the embodiments 400, 450, and 460 of the methods discussed above. FIG. 5 illustrates an embodiment of a search engine system 500 that generates search results in response to search queries from one or more clients 510. Each client 510 may have a search assistant, such as search assistant 512. It should be appreciated that the layout of the search engine system 500 is merely exemplary and may take on any other suitable layout or configuration. The search engine system 500 is used to search an index of documents, such as billions of web-pages or other documents indexed by modern search engines.

Note that the search engine system 500 can be used as an Internet search engine, for locating documents on the WWW and/or as an Intranet search engine, for locating documents stored on servers or other hosts within an Intranet. In addition, the methodology described herein is applicable to implementations where only portions of documents, such as titles and abstracts, are stored in the database of the search engine system 500.

The search engine system 500 may include multiple data centers each housing a backend. The data centers are generally widely dispersed from one another, such as across the continental United States. Search queries submitted by users at one of the clients 510 to the search engine system 500 are routed to an appropriate backend as part of the Domain Name System (DNS), based on current load, geographic locality and/or whether that data center is operating.

Each backend preferably includes multiple query servers, such as query server 516, coupled to a communications network 514 via a client communication module 518. The communications network 514 may be the Internet, but may also be any local area network (LAN) and/or wide area network (WAN). In some embodiments, each query server 516 is a Web server that receives search query requests and delivers search results in the form of web pages via HTTP, XML or similar protocols. Alternatively, if the query server 516 is used within a LAN, i.e., internally and not by the public, it may be an Intranet server. In essence, the query servers, such as query server 516, are configured to control the search process, including searching a document index, analyzing and formatting the search results.

Each backend may also include a query receipt, processing and response module 520 for managing the processing of search queries by multiple query processing controllers, such as query processing controller 522 in the generic search and facts query processing controller 538 in the facts search engine, that are coupled to the query server 516. Each query processing controller 522 may be coupled to a cache 530, an inverse document index 526 and a document database 528. Each query processing controller 522 is configured to receive requests from one of the query servers, such as the query server 516, and transmit the requests to the cache 530, the inverse document index 526 and the document database 528.

The cache 530 is used to increase search efficiency by temporarily storing previously located search results. The efficiency and cost of performing a search is dependent on a number of factors, such as the various combinations of terms and/or keywords used in the search query, the length of time spent on the search and the number of documents indexed. The average response time and cost of a search is lowered by storing the search results of previously requested search queries in the temporary storage or cache 530 of the search engine system 500. One of the benefits of keeping a cache of commonly searched information is that it ensures a fast response to subsequent search queries for the same information, as it takes less time to retrieve the information from local memory. Another benefit of caching commonly searched information is to reduce the cost of servicing multiple search queries requesting the same information. When the result of a search is cached, there is no need to perform another search of the document database 528, which may be distributed over multiple disks and/or memory arrays on multiple remote computer servers. Retrieving such information from the multiple disks and/or memory arrays in multiple remote computer servers requires significantly more time and resources than retrieving the information from the cache 530. Instead, an index contains a pointer to a cache entry corresponding to a current search query.

The search rank values for the documents in the search results are conveyed to the query processing controller 522 and/or the query server 516, and are used to construct an ordered search result list. Once the query processing controller 522 constructs the ordered search result list, the query processing controller 522 transmits to the document database 528 a request for snippets of an appropriate subset of the documents in the ordered search list. For example, the query processing controller 522 may request snippets for the first fifteen or so of the documents in the ordered search result list. The document database 528 constructs snippets based on the search query, and returns the snippets to the query processing controller 522. The query processing controller 522 then returns a list of located documents and snippets back to the query server 516. In some embodiments, the snippets are stored in the cache server 530 along with the cached results. As a result, in these embodiments the query processing controller 522 only requests snippets for documents, if any, for which it is unable to obtain valid cached snippets from the cache server 530.

The facts query processing controller 538 may similarly manage the processing of a current search query. Prior to accessing one or more instances of a partitioned facts index 542, one or more instances of a partitioned facts repository 544 and/or a facts cache 546, the facts query processing controller 538 may utilize Bloom filters 540 to simulate an access operation using an embodiment of the methods described previously. In this way, the facts query processing controller 538 may improve resource allocation and the efficiency of the facts search engine. In another embodiment, the Bloom filters 540 are located in the query server 516, which utilizes the Bloom filters 540 to simulate an access operation using an embodiment of the methods described previously.

The query server 516 may process results provided by the query processing controller 522 (i.e., results from the generic search engine) and/or the facts query processing controller 538 (i.e., results from the facts search engine). The query server 516 may determine if results from the facts search engine correspond to a respective search query (e.g., by testing the results against reliability criteria and/or relevance criteria) and may determine which results are provided to a client, such as client 510_1, and a format of the results.

Figure 6:
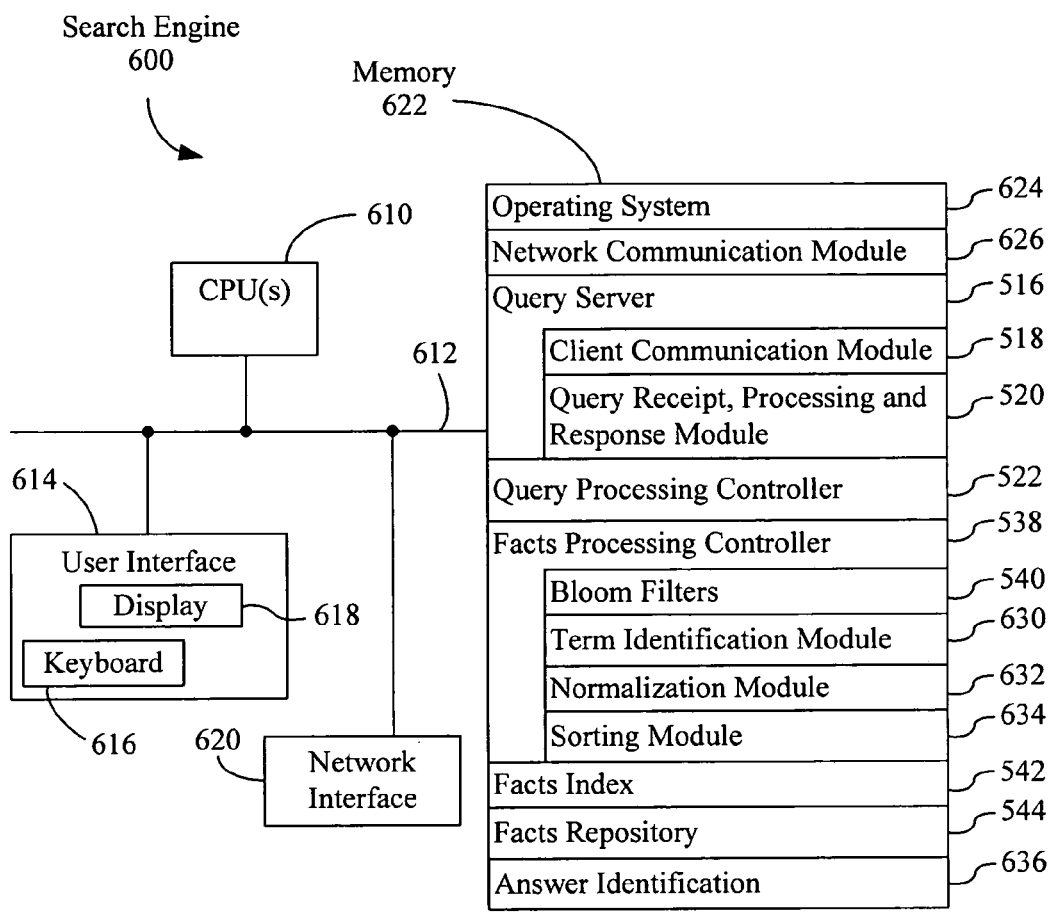
FIG. 6 is a block diagram illustrating an embodiment of a search engine.

FIG. 6 is block diagram illustrating an embodiment of a search engine 600. The search engine 600 may include at least one data processor or central processing unit (CPU) 610, one or more optional user interfaces 614, a communications or network interface 620 for communicating with other computers, servers and/or clients, a memory 622 and one or more signal lines 612 for coupling these components to one another. The user interface 614 may have one or more keyboards 616 and/or displays 618. The one or more signal lines 612 may constitute one or more communications busses.

The memory 622 may include high-speed random access memory, including solid state or integrated circuit memory devices such as dynamic random access memory and/or flash memory devices, and/or non-volatile memory, such as one or more magnetic disk storage devices, optical storage devices, and/or static memory. The memory 622 may store an operating system 624, such as LINUX, UNIX or WINDOWS, that includes procedures (or a set of instructions) for handling basic system services and for performing hardware dependent tasks. The memory 622 may also store communication procedures (or a set of instructions) in a network communication module 626. The communication procedures are used for communicating with clients, such as the clients 510 (FIG. 5), and with other servers and computers in the search engine 600.

The memory 622 may also store the query server 516 (or a set of instructions), query processing controller 522 (or a set of instructions), facts processing controller 538 (or a set of instructions), facts index 542, facts repository 544 and answer identification (or a set of instructions) 636. The query server 516 may include the following elements, or a subset or superset of such elements: the client communication module 518 and the query receipt, processing and response module 520. The facts processing controller 538 may include Bloom filters 540, a term identification module 630, a normalization module 632 and a sorting module 634.

Although FIG. 6 (like FIG. 5) shows search engine 600 as a number of discrete items, FIG. 6 is intended more as a functional description of the various features which may be present in a search engine system rather than as a structural schematic of the embodiments described herein. In practice, and as recognized by those of ordinary skill in the art, the functions of the search engine 600 may be distributed over a large number of servers or computers, with various groups of the servers performing particular subsets of those functions. Items shown separately in FIG. 6 could be combined and some items could be separated. For example, some items shown separately in FIG. 6 could be implemented on single servers and single items could be implemented by one or more servers. The actual number of servers in a search engine system and how features, such as the query processing controller 522 and/or the facts processing controller 538, are allocated among them will vary from one implementation to another, and may depend in part on the amount of information stored by the system and/or the amount data traffic that the system must handle during peak usage periods as well as during average usage periods.

Figure 7:
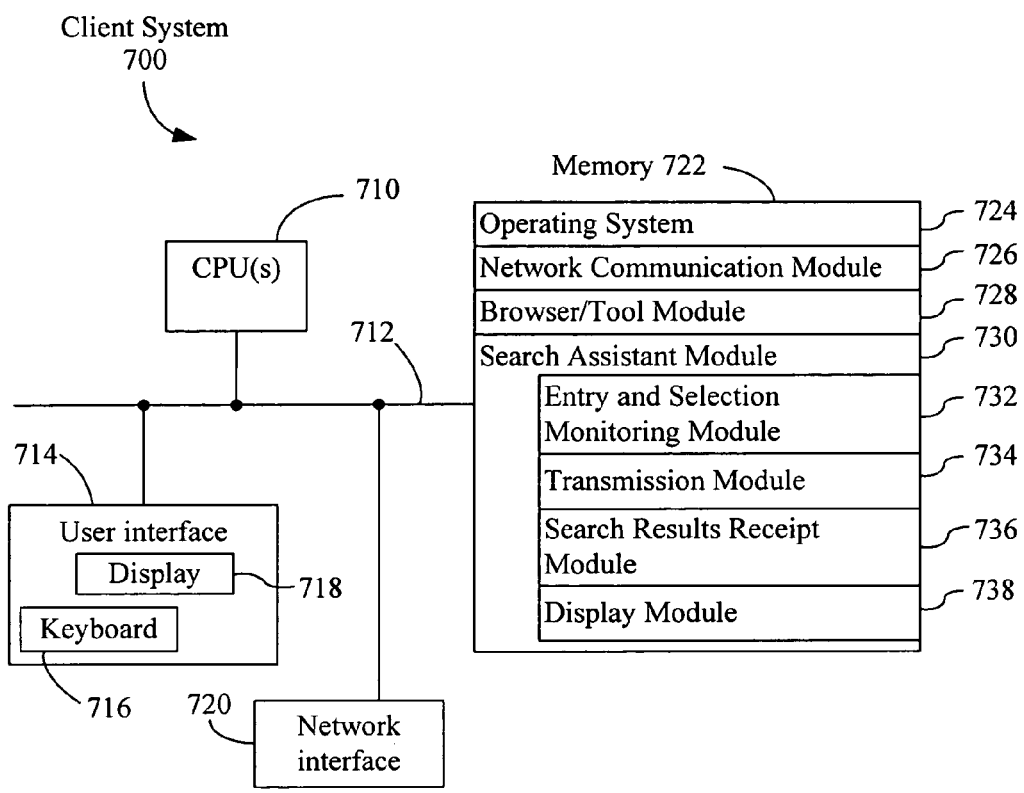
FIG. 7 is a block diagram illustrating an embodiment of a client system.

FIG. 7 illustrates a block diagram of an embodiment of a client system 700. The client system 700 may include at least one data processor or central processing unit (CPU) 710, one or more optional user interfaces 714, a communications or network interface 720 for communicating with other computers, servers and/or clients, a memory 722 and one or more signal lines 712 for coupling these components to one another. The user interface 714 may have one or more keyboards 716 and/or one or more displays 718. The one or more signal lines 712 may constitute one or more communications busses.

The memory 722 may include high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 722 may optionally include one or more storage devices remotely located from the CPU(s) 710. The memory 722 may store an operating system 724, such as LINUX, UNIX or WINDOWS, that includes procedures (or a set of instructions) for handling basic system services and for performing hardware dependent tasks. The memory 722 may also store communication procedures (or a set of instructions) in a network communication module 726. The communication procedures are used for communicating with a search engine.

The memory may also include a browser or browser tool module 728 (or a set of instructions) and a search assistant module 730 (or a set of instructions). The search assistant module 730 may include an entry and selection monitoring module 732 for monitoring user input, a transmission module 734 for sending a search query, a search results receipt module 736 for receiving search results, and a display module 738 for displaying search results as well as web pages, html or XML documents, and/or other documents.

In embodiments where the client system 700 is coupled to a local server computer, one or more of the modules and/or applications in the memory 722 may be stored in a server computer at a different location than the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. The memory 722 may include additional modules and/or sub-modules, or fewer modules and/or sub-modules. For example, the search assistant module 730 may be integrated into the browser/tool module 728. The memory 722, therefore, may include a subset or a superset of the above identified modules and/or sub-modules.

Figure 8:
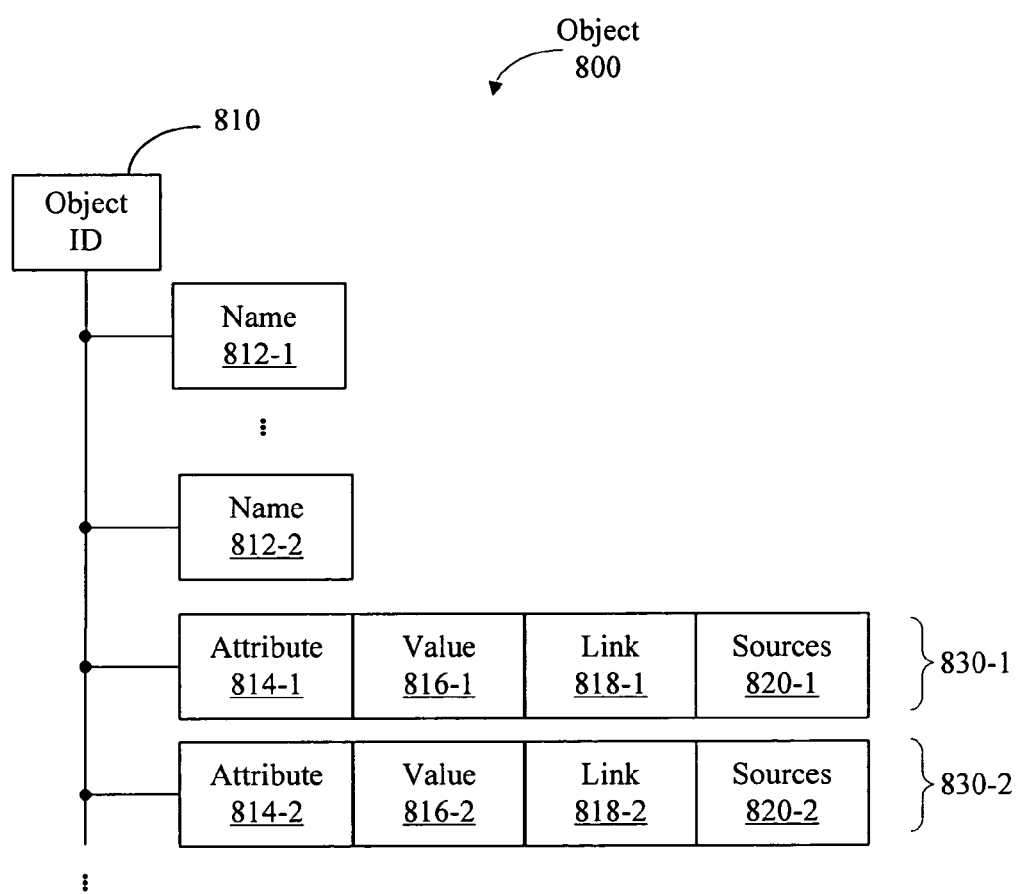
FIG. 8 is a block diagram illustrating an embodiment of a facts repository.

Some of the data structures used in search engines, such as the search engine 600 (FIG. 6), are described below. FIG. 8 is a block diagram illustrating an embodiment of an object data structure 800, herein called an object for convenience, stored in 544 (FIG. 5). The facts repository 544 may include multiple instances of such objects 800. The object 800 includes an object ID 810, one or more names 812 of the object, and one or more attribute-value records 830. In some embodiments, one or more of the names 812 may have a similar structure to the one or more attribute-value records 830. An attribute-value record 830 includes an attribute 814 associated with the object, one or more corresponding values 816 associated with the object, one or more links 818 to related document and/or content locations, and a list of one or more sources 820, such as documents, of the attribute-value pair. In some embodiments, the object name or names 812 are also stored in one or more attribute-value records 830.

Figure 9:
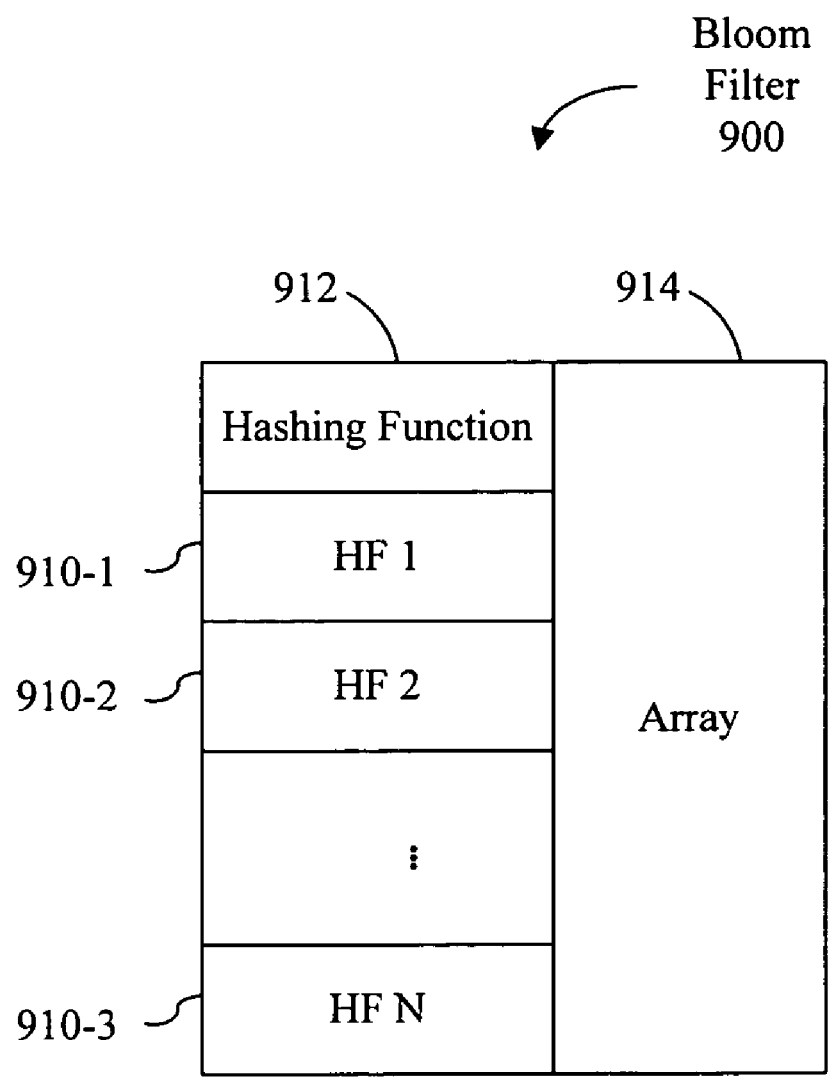
FIG. 9 is a block diagram illustrating an embodiment of a Bloom filter.

FIG. 9 is a block diagram illustrating an embodiment of a Bloom filter 900. The Bloom filter 900 includes one or more entries 910 for identifying hashing functions 912 used by the Bloom filter and an array 914. Alternately, the Bloom filter 900 includes the set of hashing functions 912. The array 914 stores flag values (e.g., bits set to "1") at array positions identified by applying the hashing functions 912 to a set of terms.

Figure 10:
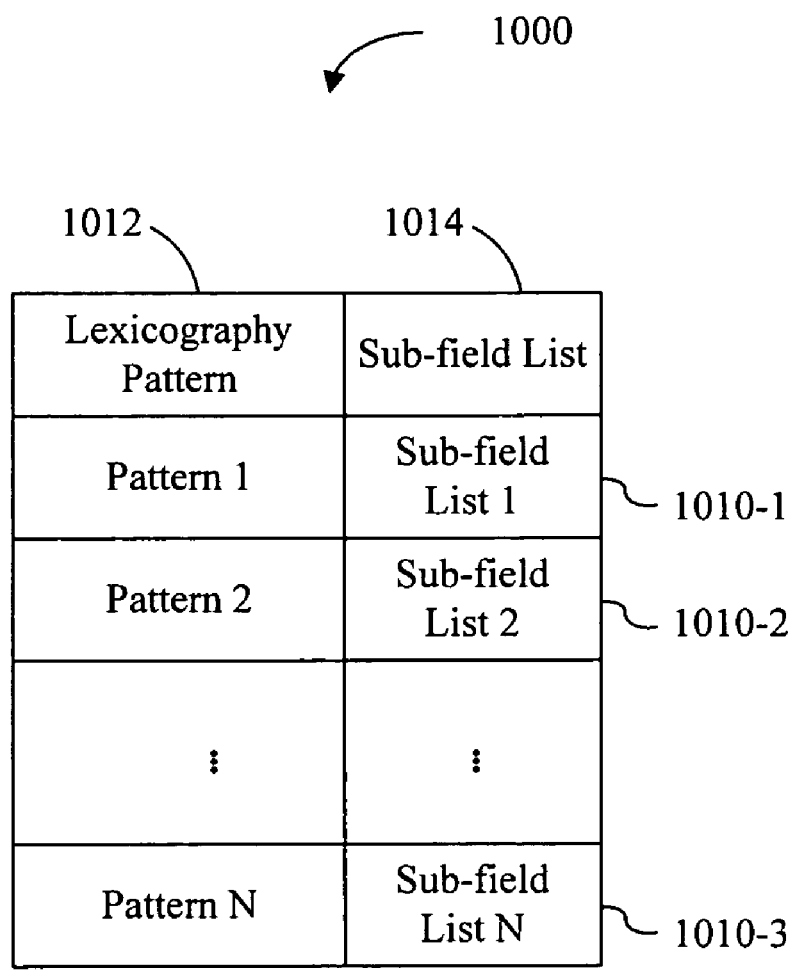
FIG. 10 is a block diagram illustrating an embodiment of a lexicography data structure.

FIG. 10 is a block diagram illustrating an embodiment of a lexicography data structure 1000. The lexicography data structure 1000 includes multiple entries 1010, each storing or identifying a lexicography pattern 1012 and a sub-field list 1014. A respective sub-field list may include one or more term types, such as nouns, verbs, adjectives and/or adverbs.

As discussed previously, FIG. 11 is a block diagram illustrating an embodiment 1100 of processing content in a facts repository 1110 using Bloom filters 314. The content may include a name field 1112, an attribute field 1114 and a value field 1116. When content is processed by the Bloom filters 314, outputs from the hashing functions 316 are stored in the Bloom filter array 318. When terms in a search query are subsequently processed by a respective Bloom filter, such as the Bloom filter 314-1, the output of the hashing function 316-1 is compared to corresponding entries in the Bloom filter array 318-1 to determine if there is a match. If yes, an output from the Bloom filter 314-1 corresponds to the positive result. As discussed previously, one or more of the outputs from the Bloom filters 314 may be used to simulate an access operation to a database, such as the facts repository 1110, thereby improving the performance and the resource allocation in the facts search engine. While embodiment 1100 illustrates the processing of a respective field, such as the name field 1112, by a respective Bloom filter, such as Bloom filter 314-1, in other embodiments, content, such as one or more of the fields in the facts repository 1110, may be processed by one or more of the Bloom filters 314. In addition, while the Bloom filters 314 are illustrated with one hashing function 316, in other embodiments there may be multiple hashing functions 316 in a respective Bloom filter, such as Bloom filter 314-1. Note that Bloom filter 314-4 processes two or more of the fields in the facts repository 1110. Bloom filter 314-4 corresponds to the term Bloom filter discussed previously.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of restricting a database access operation, comprising:
   applying a plurality of Bloom filters corresponding to a plurality of fields in a database to two or more terms in a record to produce a first plurality of outputs;
   enabling an access operation to the database if the first plurality of outputs correspond to a positive result; and
   when the access operation is enabled, returning a result from the access operation.

2. The method of restricting a database access operation in claim 1, wherein the record corresponds to a query.

3. The method of restricting a database access operation in claim 2, further comprising:
   identifying first and second subsets of the terms in the query;
   applying a first Bloom filter in the plurality of Bloom filters to the first subset to produce a first output; and
   applying a second Bloom filter in the plurality of Bloom filters to the second subset to produce a second output,
   wherein enabling the access operation is further in accordance with the first output and the second output corresponding to the positive result.

4. The method of restricting a database access operation in claim 2, further comprising:
   identifying a plurality of subsets of the terms in the query; and
   applying one or more of the Bloom filters to each of the subsets to produce a second plurality of outputs,
   wherein enabling the access operation is further in accordance with the second plurality of outputs from the one or more Bloom filters corresponding to at least one of a plurality of success patterns.

5. The method of restricting a database access operation in claim 2, further comprising:
   applying a normalization operation to the query to produce a normalized set of terms; and
   applying an additional Bloom filter to each of the terms in the normalized set of terms to produce an additional output;
   wherein enabling the access operation is further in accordance with the additional output corresponding to the positive result.

6. The method of restricting a database access operation in claim 1, further comprising removing extraneous terms from the record.

7. The method of restricting a database access operation in claim 1, further comprising sorting the two or more terms in the record to produce a sorted record.

8. The method of restricting a database access operation in claim 7, further comprising:
   applying a first Bloom filter to the sorted record to produce a first output,
   wherein enabling the access operation is further in accordance with the first output corresponding to the positive result.

9. The method of restricting a database access operation in claim 1, wherein the database comprises factual information, and the plurality of fields in the database include objects, attributes and values.

10. The method of restricting a database access operation in claim 1, further comprising:
    parsing the terms in the record in a plurality of ways to produce a plurality of parsed sets of terms; and
    applying at least two of the Bloom filters in the plurality of Bloom filters to the plurality of parsed sets of terms to produce a second plurality of outputs;
    wherein enabling the access operation is further in accordance with the second plurality of outputs corresponding to the positive result.

11. The method of restricting a database access operation in claim 10, wherein at least the two Bloom filters respectively correspond to an attribute field and a value field.

12. The method of restricting a database access operation in claim 1, further comprising:
    applying a first Bloom filter in the plurality of Bloom filters to a first term in the record to produce a first output;
    sorting remaining terms in the record; and
    applying a second Bloom filter in the plurality of Bloom filters to the sorted remaining terms in the record to produce a second output,
    wherein enabling the access operation is further in accordance with the first output and the second output corresponding to the positive result, and wherein a first field corresponding to the first Bloom filter includes attributes and a second field corresponding to the second Bloom filter includes values.

13. The method of restricting a database access operation in claim 1, further comprising:
    applying a first Bloom filter in the plurality of Bloom filters to a first two terms in the record to produce a first output;
    sorting remaining terms in the record; and
    applying a second Bloom filter in the plurality of Bloom filters to the sorted remaining terms in the record to produce a second output,
    wherein enabling the access operation is further in accordance with the first output and the second output corresponding to the positive result, and wherein a first field corresponding to the first Bloom filter includes attributes and a second field corresponding to the second Bloom filter includes values.

14. The method of restricting a database access operation in claim 1, further comprising:
    applying a first Bloom filter in the plurality of Bloom filters to a last two terms in the record to produce a first output;
    sorting remaining terms in the record; and
    applying a second Bloom filter in the plurality of Bloom filters to the sorted remaining terms in the record to produce a second output,
    wherein enabling the access operation is further in accordance with the first output and the second output corresponding to the positive result, and wherein a first field corresponding to the first Bloom filter includes attributes and a second field corresponding to the second Bloom filter includes values.

15. The method of restricting a database access operation in claim 1, further comprising:
    applying a first Bloom filter in the plurality of Bloom filters to a last term in the record to produce a first output;
    sorting remaining terms in the record; and
    applying a second Bloom filter in the plurality of Bloom filters to the sorted remaining terms in the record to produce a second output,
    wherein enabling the access operation is further in accordance with the first output and the second output corresponding to the positive result, and wherein a first field corresponding to the first Bloom filter includes attributes and a second field corresponding to the second Bloom filter includes values.

16. A computer-program product for restricting a database access operation, comprising:
    a computer readable storage medium and a computer program mechanism embedded therein, the computer program mechanism comprising:

instructions for applying a plurality of Bloom filters corresponding to a plurality of fields in a database to two or more terms in a record to produce a first plurality of outputs;

instructions for enabling an access operation to the database if the first plurality of outputs correspond to a positive result; and instructions for returning a result from the access operation when the access operation is enabled.

17. A computer, comprising:

memory;

a processor; and a program for restricting a database access operation, wherein the program is stored in the memory and executed by the processor, the program including:

instructions for applying a plurality of Bloom filters corresponding to a plurality of fields in a database to two or more terms in a record to produce a first plurality of outputs;

instructions for enabling an access operation to the database if the first plurality of outputs correspond to a positive result; and instructions for returning a result from the access operation when the access operation is enabled.

18. A computer, comprising:

one or more processors;

a network interface;

memory; and one or more signal lines for interconnecting the one or more processors, a network interface, and memory, wherein the computer includes:

means for applying a plurality of Bloom filters corresponding to a plurality of fields in a database to two or more terms in a record to produce a first plurality of outputs;

means for enabling an access operation to the database if the first plurality of outputs correspond to a positive result; and means for returning a result from the access operation when the access operation is enabled.

19. The computer-program product of claim 16, wherein the record corresponds to a query.

20. The computer-program product of claim 19, further comprising:

instructions for identifying first and second subsets of the terms in the query;

instructions for applying a first Bloom filter in the plurality of Bloom filters to the first subset to produce a first output; and instructions for applying a second Bloom filter in the plurality of Bloom filters to the second subset to produce a second output, wherein enabling the access operation is further in accordance with the first output and the second output corresponding to the positive result.

21. The computer-program product of claim 19, further comprising:

instructions for identifying a plurality of subsets of the terms in the query; and instructions for applying one or more of the Bloom filters to each of the subsets to produce a second plurality of outputs, wherein enabling the access operation is further in accordance with the second plurality of outputs from the one or more Bloom filters corresponding to at least one of a plurality of success patterns.

22. The computer-program product of claim 19, further comprising:

instructions for applying a normalization operation to the query to produce a normalized set of terms; and instructions for applying an additional Bloom filter to each of the terms in the normalized set of terms to produce an additional output;

wherein enabling the access operation is further in accordance with the additional output corresponding to the positive result.

23. The computer-program product of claim 16, further comprising instructions for sorting the two or more terms in the record to produce a sorted record; and instructions for applying a first Bloom filter to the sorted record to produce a first output, wherein enabling the access operation is further in accordance with the first output corresponding to the positive result.

24. The computer-program product of claim 16, further comprising:

instructions for parsing the terms in the record in a plurality of ways to produce a plurality of parsed sets of terms; and instructions for applying at least two of the Bloom filters in the plurality of Bloom filters to the plurality of parsed sets of terms to produce a second plurality of outputs;

wherein enabling the access operation is further in accordance with the second plurality of outputs corresponding to the positive result.

25. The computer-program product of claim 24, wherein at least the two Bloom filters respectively correspond to an attribute field and a value field.

26. The computer-program product of claim 16, further comprising:

instructions for applying a first Bloom filter in the plurality of Bloom filters to a first term in the record to produce a first output;

instructions for sorting remaining terms in the record; and instructions for applying a second Bloom filter in the plurality of Bloom filters to the sorted remaining terms in the record to produce a second output, wherein enabling the access operation is further in accordance with the first output and the second output corresponding to the positive result, and wherein a first field corresponding to the first Bloom filter includes attributes and a second field corresponding to the second Bloom filter includes values.

27. The computer of claim 17, wherein the record corresponds to a query.

28. The computer of claim 27, further comprising:

instructions for identifying first and second subsets of the terms in the query;

instructions for applying a first Bloom filter in the plurality of Bloom filters to the first subset to produce a first output; and instructions for applying a second Bloom filter in the plurality of Bloom filters to the second subset to produce a second output, wherein enabling the access operation is further in accordance with the first output and the second output corresponding to the positive result.

29. The computer of claim 27, further comprising:

instructions for identifying a plurality of subsets of the terms in the query; and instructions for applying one or more of the Bloom filters to each of the subsets to produce a second plurality of outputs, wherein enabling the access operation is further in accordance with the second plurality of outputs from the one or more Bloom filters corresponding to at least one of a plurality of success patterns.

30. The computer of claim 27, further comprising:

instructions for applying a normalization operation to the query to produce a normalized set of terms; and instructions for applying an additional Bloom filter to each of the terms in the normalized set of terms to produce an additional output;

wherein enabling the access operation is further in accordance with the additional output corresponding to the positive result.

31. The computer of claim 17, further comprising instructions for sorting the two or more terms in the record to produce a sorted record; and instructions for applying a first Bloom filter to the sorted record to produce a first output, wherein enabling the access operation is further in accordance with the first output corresponding to the positive result.

32. The computer of claim 17, further comprising:

instructions for parsing the terms in the record in a plurality of ways to produce a plurality of parsed sets of terms; and instructions for applying at least two of the Bloom filters in the plurality of Bloom filters to the plurality of parsed sets of terms to produce a second plurality of outputs;

wherein enabling the access operation is further in accordance with the second plurality of outputs corresponding to the positive result.

33. The computer of claim 32, wherein at least the two Bloom filters respectively correspond to an attribute field and a value field.

34. The computer of claim 17, further comprising:

instructions for applying a first Bloom filter in the plurality of Bloom filters to a first term in the record to produce a first output;

instructions for sorting remaining terms in the record; and instructions for applying a second Bloom filter in the plurality of Bloom filters to the sorted remaining terms in the record to produce a second output, wherein enabling the access operation is further in accordance with the first output and the second output corresponding to the positive result, and wherein a first field corresponding to the first Bloom filter includes attributes and a second field corresponding to the second Bloom filter includes values.

\* \* \* \* \*